(12) United States Patent
Grether et al.

(10) Patent No.: US 11,566,724 B2
(45) Date of Patent: *Jan. 31, 2023

(54) FLUID DISTRIBUTOR FOR A VEHICLE FLUID DISTRIBUTION SYSTEM AND PROCESS OF EJECTION OF A FLUID USING SUCH A SYSTEM

(71) Applicant: A. Raymond Et Cie, Grenoble (FR)

(72) Inventors: Urs Grether, Loerrach (DE); Stéphane Baron, Magstatt le Bas (FR)

(73) Assignee: A. Raymond Et Cie, Grenoble (FR)

( * ) Notice: Subject to any disclaimer, the term of this patent is extended or adjusted under 35 U.S.C. 154(b) by 38 days.

This patent is subject to a terminal disclaimer.

(21) Appl. No.: 16/875,631

(22) Filed: May 15, 2020

(65) Prior Publication Data
US 2020/0362981 A1 Nov. 19, 2020

(30) Foreign Application Priority Data
May 17, 2019 (FR) ...................................... 1905174

(51) Int. Cl.
*F16K 31/06* (2006.01)
*F16K 7/12* (2006.01)
(Continued)

(52) U.S. Cl.
CPC .......... *F16K 31/0641* (2013.01); *F16K 7/126* (2013.01); *F16K 11/161* (2013.01); *B60S 1/481* (2013.01)

(58) Field of Classification Search
CPC .. F16K 7/123; F16K 31/0641; F16K 31/0627; F16K 31/0634; F16K 11/161;
(Continued)

(56) References Cited

U.S. PATENT DOCUMENTS 4,181,154 A 1/1980 Oley et al.
4,237,931 A * 12/1980 Rafaely .................. A01J 7/025
137/625.27

(Continued)

FOREIGN PATENT DOCUMENTS

EP 0250298 A1 12/1987
JP 63-303278 A 12/1988
(Continued)

OTHER PUBLICATIONS

European Search Report and Opinion for European Application No. 20171649, dated Oct. 19, 2020, 11 pages.

*Primary Examiner* — Craig J Price
*Assistant Examiner* — Andrew J Rost
(74) *Attorney, Agent, or Firm* — TraskBritt (57) ABSTRACT

A fluid distributor comprising: a fluid inlet, a first outlet connected to the inlet by a first fluid communication channel, a second outlet connected to the inlet by a second fluid communication channel, an actuator comprising a movable piston capable of moving between an initial position and a switched position; a first deformable diaphragm, in contact with the first end of the piston, and configured to close the first channel when the piston is in its switched position; a second deformable diaphragm, in contact with the second end of the piston, and configured to close the second channel when the piston is in its initial position.

16 Claims, 5 Drawing Sheets

(51) Int. Cl.
*F16K 11/16* (2006.01)
*B60S 1/48* (2006.01)

(58) Field of Classification Search
CPC .. F16K 11/022; F16K 11/048; F16K 31/0603; B05B 9/423; B05B 9/0413; B60S 1/481; B60S 1/62; B60S 1/66; B60S 1/56; B60S 1/48; B60S 1/52; Y10T 137/87716; Y10T 137/877; Y10T 137/87708; Y10T 137/87772
USPC .............. 137/625.18, 595, 613, 614.11, 883
See application file for complete search history.

(56) References Cited

U.S. PATENT DOCUMENTS

| | | | | |
|---|---|---|---|---|
| 4,259,985 | A * | 4/1981 | Bergmann | F16K 7/045 137/595 |
| 4,766,933 | A * | 8/1988 | Champseix | F16K 11/048 137/625.5 |
| 4,979,366 | A * | 12/1990 | Compton | F16D 25/14 60/533 |
| 5,407,134 | A * | 4/1995 | Thompson | A01C 23/042 111/118 |
| 5,676,405 | A * | 10/1997 | Reed | A47L 11/34 251/149.6 |
| 6,026,860 | A * | 2/2000 | Teichmann | F16K 31/06 137/870 |
| 6,951,223 | B2 * | 10/2005 | Fukushima | B60S 1/481 134/186 |
| 2007/0221273 | A1 * | 9/2007 | Landers | F16K 31/1262 137/510 |

FOREIGN PATENT DOCUMENTS

| | | |
|---|---|---|
| WO | 2018/188823 A1 | 10/2018 |
| WO | 2019/029915 A1 | 2/2019 |

* cited by examiner

FLUID DISTRIBUTOR FOR A VEHICLE FLUID DISTRIBUTION SYSTEM AND PROCESS OF EJECTION OF A FLUID USING SUCH A SYSTEM

PRIORITY CLAIM

This application claims the benefit of the filing date of French Patent Application Serial No. FR1905174, filed May 17, 2019, for "Fluid Distributor for a Fluid Distribution System for a Vehicle and Method for Ejecting a Fluid Using Such a System," the disclosure of which is incorporated herein in its entirety by this reference.

TECHNICAL FIELD

The present disclosure relates to a fluid distributor particularly suitable for a system for distributing a fluid, for example a cleaning product, in a motor vehicle.

BACKGROUND

With the development of autonomous motor vehicles, an increasing number of cameras and sensors are being incorporated into vehicles to analyze their environment and assist driving. These cameras and sensors are placed at multiple points around the perimeter of the vehicle and must be cleaned regularly to guarantee the assistance remains reliable. It is important for the cleaning to be able to be activated on demand and independently for each camera or sensor, so as not to jeopardize the assistance and to maintain good control of the vehicle.

From the prior art, the document WO2018188823 is known, which proposes a line for distributing cleaning liquid in a vehicle, the line being intended to feed a plurality of nozzles for ejecting the liquid. The distribution line is equipped with a plurality of valves, each being associated with a nozzle and electrically set to an open or closed state by a control unit so as to supply the nozzle or alternatively to block the supply of liquid to the nozzle. Such a distribution line configuration allows for an individualized and independent supply to each nozzle. However, it requires a long linear length of distribution line to conduct the liquid to each nozzle in the vehicle.

To limit the length of the distribution line, document WO2019029915 proposes a single liquid distribution line, positioned along all the points of the vehicle requiring an ejection nozzle. Each nozzle comprises hydraulic connection members on the distribution line and an actuating device, such as a solenoid valve, which is electrically set to an open or closed state so as to open or, respectively, shut off the fluid communication between the distribution line and the nozzle. The disadvantage of this solution is that each nozzle must be combined with an actuating device, which is not economical. In addition, the space occupied by each nozzle is relatively significant due to the associated actuation device.

BRIEF SUMMARY

The present disclosure provides an alternative solution to the solutions of the state of the art, aiming to limit the length of the fluid distribution line and to simplify the actuation of the ejection devices. It relates, in particular, to a fluid distributor that makes it possible to simplify the actuation of the ejection devices and that is, in particular, suitable for a fluid distribution system for a vehicle, the architecture of which system makes it possible to limit the length of the distribution line. The present disclosure also relates to a method for ejecting a fluid using such a distribution system.

The present disclosure relates to a fluid distributor, comprising:
a fluid inlet,
a first outlet and a first fluid communication channel between the inlet and the first outlet,
a second outlet and a second fluid communication channel between the inlet and the second outlet,
an actuator comprising a movable piston able to move between an initial position and a switched position, the piston being disposed between a first and a second deformable diaphragm;
the first diaphragm one side of which is in contact with a first end of the piston and the other side of which is intended to be in contact with the fluid, configured to close the first channel when the piston is in its switched position, the first channel being open when the piston is in its initial position;
the second diaphragm, one side of which is in contact with a second end of the piston and the other side of which is intended to be in contact with the fluid, configured to close the second channel when the piston is in its initial position; the second channel being open when the piston is in its switched position.

According to other advantageous and non-limiting features of the invention, taken alone or in any technically feasible combination:
The fluid distributor comprises a return element for returning the piston to its initial position when the actuator is inactive and when the pressure of the fluid at the inlet of the distributor is lower than a predetermined pressure;
the predetermined pressure is between 1 bar and 15 bar;
the fluid-contact surface area of the first diaphragm is smaller than that of the second diaphragm when the piston is in the switched position, and the fluid-contact surface area of the second diaphragm is smaller than that of the first diaphragm when the piston is in the initial position;
the actuator is an electromagnetic actuator connected to an electrical connector of the distributor and adapted to control the movement of the piston into its switched position;
the first and second diaphragms seal, respectively, between a central body of the distributor and the first fluid communication channel and between the central body and the second fluid communication channel;
the fluid distributor comprises:
a central body in which the actuator and an electrical connector are disposed,
a first body comprising the first outlet and all or part of the first fluid communication channel,
a second body comprising the second outlet and all or part of the second fluid communication channel; the inlet of the distributor forming a part of the first body, the second body or the central body;
the inlet and the two outlets each have a central axis, the central axes of the inlet and of the two outlets are disposed in the same plane;
the electrical connector is disposed in the same plane as the central axes of the inlets and outlets;
the first body and the second body are identical;
the central body, the first body and the second body are made of molded plastic material;
the inlet and the two outlets each have a male or female fluid quick-connect end piece.

The present disclosure also relates to a system for distributing a fluid in a vehicle comprising:
- a plurality n of independent fluid ejection devices;
- a plurality n−1 of fluid distributors, such as those mentioned above, each being configured to establish a fluid connection either between the inlet and the first outlet, or between the inlet and the second outlet, respectively, in an initial state and in a switched state;
- means for conducting fluid to connect a fluid reservoir to the n ejection devices, via the n−1 fluid distributors.

According to other advantageous and non-limiting features of the invention, taken alone or in any technically feasible combination:
- the means for conducting fluid comprise:
  - a main fluid supply conduit for connecting the inlet of a first distributor to a pump connected to a fluid reservoir;
  - a plurality of fluid outlet conduits for connecting each ejection device to an outlet of a distributor;
  - at least one intermediate conduit for connecting at least one outlet of a distributor and the inlet of a subsequent distributor;
- the ejection devices are jet nozzles, telescopic nozzles or oscillating nozzles.

Lastly, the present disclosure relates to a method for ejecting a fluid through an ejection device, using the fluid distribution system as above, comprising the following steps:
- activating the actuator of at least one distributor to set the distributor to its switched state, so as to put the main fluid supply conduit and the ejection device in fluid communication;
- activating the pump to pressurize the fluid in the distribution system and to eject it through the ejection device;
- deactivating the actuator during the ejection of the fluid.

The method for ejecting a fluid through an ejection device advantageously comprises the following step:
- stopping the pump so that the pressure of the fluid in the distribution system is lower than a predetermined pressure, to stop the ejection of fluid through the ejection device and to return the plurality n−1 of distributors to their initial state.

BRIEF DESCRIPTION OF THE DRAWINGS

Other features and advantages of the present disclosure will emerge from the following detailed description of embodiments of the present disclosure with reference to the accompanying drawings wherein.

DETAILED DESCRIPTION

In the descriptive part, the same references in the drawings may be used for elements of the same type. The drawings are schematic representations which, for the sake of readability, are not necessarily to scale.

The present disclosure relates to a fluid distributor 100 comprising a fluid inlet 1 and two outlets 2, 3 and is able to be in two distinct states: a designated "initial state" and a designated "switched state". It is called a "distributor" due to the fact that it is configured to establish a fluid connection either between the inlet 1 and the first outlet 2, or between the inlet 1 and the second outlet 3, in its initial state and in its switched state, respectively.

Figure 1:
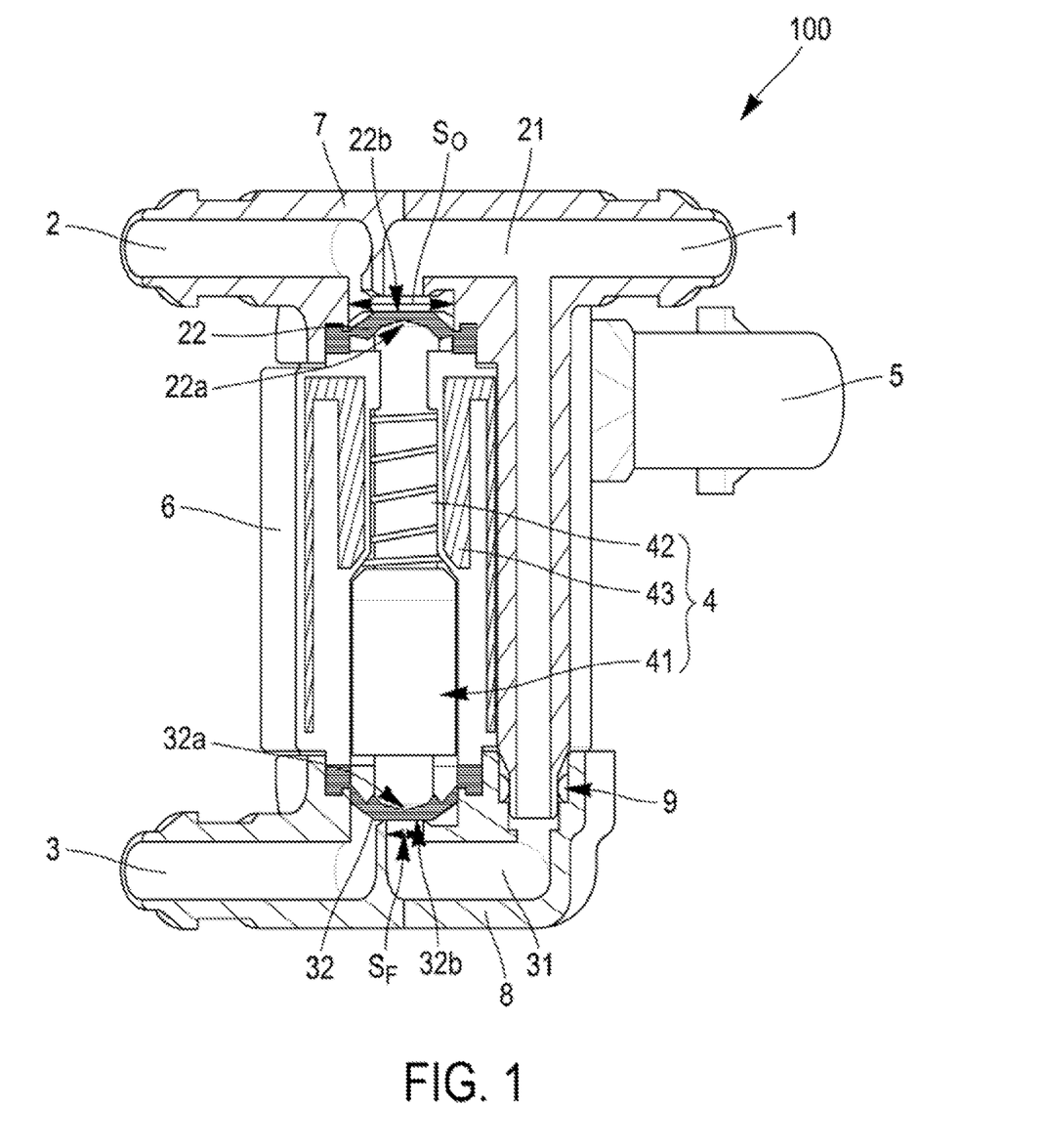
FIG. 1 shows a fluid distributor according to the present disclosure.

As shown in FIG. 1, the fluid distributor 100 comprises a first fluid communication channel 21 connecting the first outlet 2 and the inlet 1. It also comprises a second fluid communication channel 31 connecting the second outlet 3 and the inlet 1.

The fluid distributor 100 further comprises an actuator 4 including a movable piston 41 able to move between an initial position (which corresponds to the initial state of the distributor 100) and a switched position (which corresponds to the switched state of the distributor 100).

Lastly, the fluid distributor 100 comprises two deformable diaphragms 22, 32 disposed on either side of the movable piston 41. Without this being limiting, the diaphragms 22, 32 may be formed from a material of the elastomer family, for example, EPDM (ethylene propylene diene monomer), EPDM reinforced with glass fibers or silicone EPDM.

A first diaphragm 22 has a face 22a in contact with the first end of the piston 41 and another face 22b intended to be in contact with the fluid. The first diaphragm 22 is configured to close the first fluid communication channel 21 when the piston 41 is in its switched position and to allow fluid communication between the inlet 1 and the first outlet 2 via the first channel 21 when the piston 41 is in its initial position.

A second diaphragm 32 has a face 32a in contact with the second end of the piston 41 and another face 32b intended to be in contact with the fluid. The second diaphragm 32 is configured to close the second fluid communication channel 31 when the piston 41 is in its initial position and to allow fluid communication between the inlet 1 and the second outlet 3 via the second channel 31 when the piston 41 is in its switched position.

It is thus understood that, when the distributor 100 is in its initial state, with the piston 41 of the actuator 4 in its initial position, the fluid may pass from the inlet 1 to the first outlet 2 through the first fluid communication channel 21, but cannot reach the second outlet 3, and, when the distributor 100 is in its switched state, with the piston 41 in its switched position, the fluid may pass from the inlet 1 to the second outlet 3 through the second fluid communication channel 31, but cannot reach the first outlet 2.

Advantageously, the fluid-contact surface area $S_f$ of the second diaphragm 32 is smaller than the fluid-contact surface area $S_o$ of the first diaphragm 22 when the piston 41 is in the initial position (as, for example, illustrated in FIG. 1). Similarly, the fluid-contact surface area of the first diaphragm 22 is smaller than that of the second diaphragm 32 when the piston 41 is in the switched position.

To this end, the example distributor 100 shown in FIG. 1 proposes a particular configuration of the fluid communication channels 21, 31. The configuration of the first channel 21 will be described here, the configuration applying in the same way to the second channel 31. The first channel 21 comprises:
- an upstream segment, establishing fluid communication from the inlet 1 to an intermediate housing in which the movable diaphragm 22 is disposed,
- a downstream segment, establishing fluid communication from the intermediate housing to the first outlet 2, the intermediate housing, the cross-section of which in the plane (x,y) (according to the reference (x,y,z) used in FIG. 1) is greater than the cross-sections, in this same plane, of the upstream and downstream segments opening into the intermediate housing.

The upstream segment, at its end opening into the intermediate housing, forms a conduit of which the central axis is substantially aligned with the center of the first diaphragm 22 and substantially normal to the face 22b of the diaphragm 22. The downstream segment, at its end opening into the intermediate housing, forms a conduit offset from the center of the first diaphragm 22 and substantially normal to the face 22b of the diaphragm 22 (FIG. 1).

When the distributor 100 is in its initial state (corresponding to the initial position of the piston 41 of the actuator 4), the first diaphragm 22 is "at rest," not deformed, as it is not pushed by the piston 41: it therefore allows the fluid to pass from the upstream segment into the intermediate housing and into the downstream segment. Fluid communication is thus established from the inlet 1 to the first outlet 2 via the first fluid communication channel 21. The surface area $S_o$ of the face 22b of the first diaphragm 22 that is in contact with the fluid is typically equal to the cross-section, in the plane (x,y), of the intermediate housing. At the same time, the second diaphragm 32 is pushed and deformed by the piston 41: it is thus pressed against the end of the upstream segment (of the second channel 31) opening into the intermediate housing (of the second channel 31) and closes the fluid communication between the upstream segment and the intermediate housing (FIG. 1); in other words, it closes the second channel 31 and cuts off the fluid communication between the inlet 1 and the second outlet 3. In the initial state, the surface area $S_f$ of the face 32b of the second diaphragm 32 that is in contact with the fluid is typically equal to the cross-section, in the plane (x,y), of the conduit at the end of the upstream segment of the second channel 31 that opens into the intermediate housing. As stated previously, when the distributor 100 is in its initial state, the surface area $S_o$ of the face 22b of the first diaphragm 22 that is in contact with the fluid is larger than the surface area $S_f$ of the face 32b of the second diaphragm 32 that is in contact with the fluid.

When the distributor 100 is in its switched state (corresponding to the switched position of the piston 41), the first diaphragm 22 is pushed and deformed by the piston 41 and is pressed against the end of the upstream segment (of the first channel 21) opening into the intermediate housing (of the first channel 21) and thus closing the fluid communication between the upstream segment and the intermediate housing; in other words, it closes the first channel 21 and cuts off the fluid communication between the inlet 1 and the first outlet 2. In this switched state, the surface area of the face 22b of the first diaphragm 22 that is in contact with the fluid is typically equal to the cross-section, in the plane (x,y), of the conduit at the end of the upstream segment of the first channel 21 that opens into the intermediate housing. At the same time, the second diaphragm 32 is "at rest," not deformed, as it is not pushed by the piston 41: it therefore lets the fluid pass from the upstream segment into the intermediate housing and into the downstream segment (of the second channel 31). Fluid communication is thus established from the inlet 1 to the second outlet 3 via the second fluid communication channel 31.

As stated previously, when the distributor 100 is in its switched state, the surface area of the face 22b of the first diaphragm 22 that is in contact with the fluid is smaller than the surface area of the face 32b of the second diaphragm 32 that is in contact with the fluid.

Advantageously, the actuator 4 is connected to an electrical connector 5 included in the distributor 100. When it is electrically energized or, in other words, when it is activated, the actuator 4 makes it possible to control the movement of the movable piston 41 into its switched position.

Preferably, the actuator 4 is an electromagnetic actuator comprising a coil 43 disposed around the piston 41: the magnetic field that is established when the actuator 4 is electrically energized causes the movement of the piston 41 into its switched position.

Note that other types of actuators could be used, such as linear motor actuators. The advantage of an electromagnetic actuator compared with other types of actuators is that it constitutes a simple and economical solution.

In the example distributor 100 in FIG. 1, the switched position of the piston 41 (not shown) is that in which it pushes and deforms the first diaphragm 22, so as to close the first communication channel 21.

When the distributor 100 is in its switched state and the fluid arrives under pressure at the inlet 1 of the distributor 100, the force applied by the fluid to the face 32b of the second diaphragm 32 is greater than the force applied to the face 22b of the first diaphragm 22 because the surface area of the face 32b that is in contact with the fluid is greater than the surface area of the face 22b that is in contact with the fluid. It is thus possible to deactivate the actuator 4 as soon as the fluid pressure is established at the inlet of the distributor 100, the difference in the fluid-contact surface areas between the two diaphragms 22, 32 being able to hold the piston 41 in its switched position (and thus hold the distributor 100 in its switched state). This provides a simple and economical solution for actuating the distributor 100, requiring only a one-time activation of the actuator 4.

Also advantageously, the fluid distributor 100 comprises a return element 42, such as, for example, a spring, to return the piston 41 to its initial position when the actuator 4 is inactive and when the pressure of the fluid at the inlet of the distributor 100 is lower than a predetermined pressure. As mentioned above, when the actuator 4 is inactive and the fluid pressure is established at the inlet 1 of the distributor 100, the difference in the fluid-contact surface areas between the two diaphragms 22, 32 makes it possible to hold the piston 41 in its switched state. "Established fluid pressure" means a fluid pressure greater than a predetermined pressure, which may, for example, be between 1 bar and 15 bar.

Below this predetermined pressure, the force applied by the fluid to the first diaphragm 22 will no longer be sufficient to counteract the sum of the force applied by the fluid to the second diaphragm 32 and the force of the return element 42. Thus, when the fluid pressure is lower than the predetermined pressure, the piston 41 returns to its initial position (corresponding to the initial state of the distributor 100): in the example distributor 100 in FIG. 1, the initial position of the piston 41 (illustrated) is that in which it pushes and deforms the second diaphragm 32, so as to close the second communication channel 31, while the first diaphragm 22 is "at rest," not deformed, allowing fluid communication in the first channel 21.

When the distributor 100 is in its initial state, if the pressure of the fluid established is greater than the predetermined pressure, the distributor 100 naturally remains in its initial state due to the difference in fluid-contact surface areas between the two diaphragms 22, 32: the fluid thus passes through the first channel 21, between the inlet 1 and the first outlet 2 of the distributor 100.

The fluid distributor 100 as described thus offers a simple and economical solution for actuation between the initial state and the switched state and vice versa. The actuator 4 is activated once to switch to the switched state, such state then being maintained, without electrical power, by the pressure of the fluid established at the inlet 1 of the distributor 100 being greater than a predetermined pressure. The return to the initial state may be achieved by reducing the fluid pressure to below a predetermined pressure.

Advantageously, the first diaphragm 22 seals between a central body 6 of the distributor 100 and the first fluid communication channel 21, and the second diaphragm 32 seals between the central body 6 and the second fluid communication channel 31. In particular, the periphery of each diaphragm 22, 32 is configured to constitute a stationary seal between the central body 6 and, respectively, the first 21 and the second 31 fluid communication channels. The central body 6 preferably contains the actuator 4 and the electrical connector 5.

The configuration of the diaphragms 22, 32 makes it possible to guarantee, without a movable seal, that the fluid does not reach the components of the actuator 4. The reliability and service life of the actuator 4 are thus greatly increased.

Figure 2A:
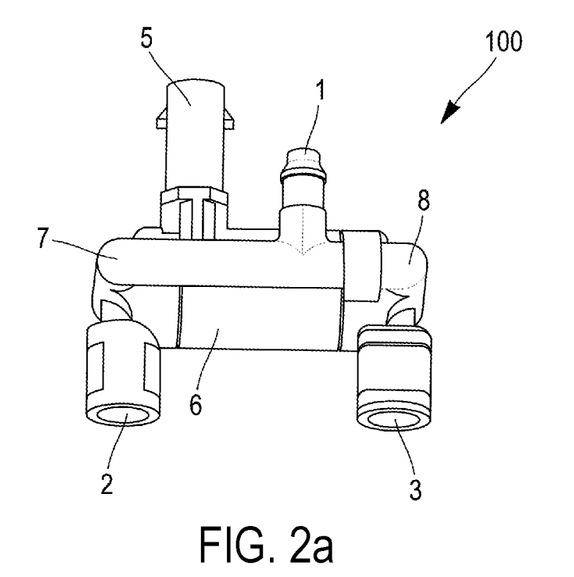
FIGS. 2a, 2b and 2c show different embodiments of a fluid distributor according to the present disclosure.
Figure 2B:
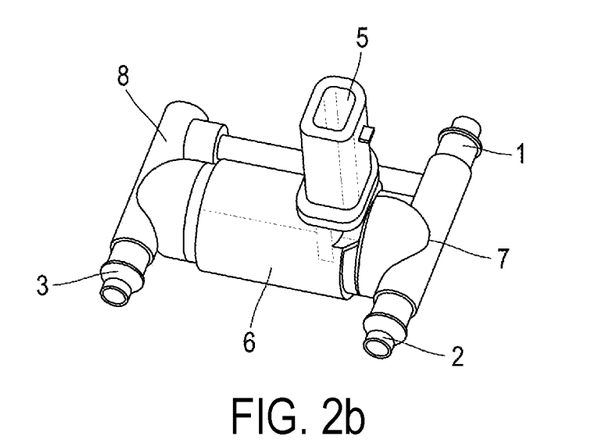
Figure 2C:
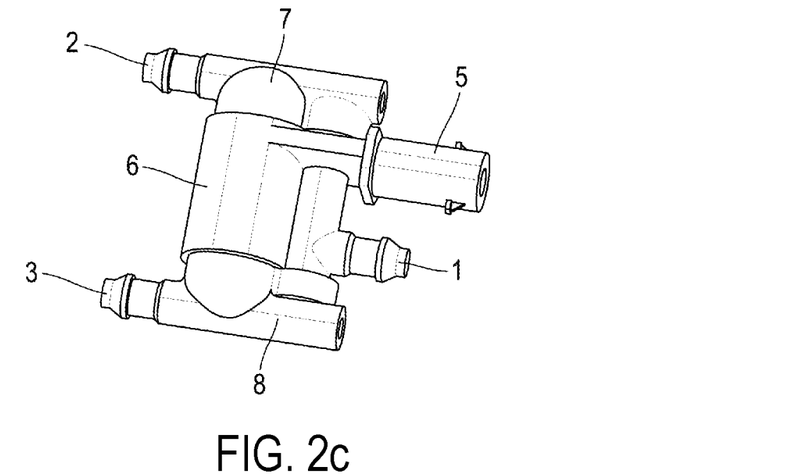

Advantageously, the distributor 100 is formed of three separate bodies 6, 7, 8 (FIGS. 1, 2a, 2b, 2c). The central body 6 is disposed in the central part of the distributor 100 and houses the actuator 4 and the electrical connector 5. A first body 7 comprises the first outlet 2 and all or part of the first fluid communication channel 21. A second body 8 comprises the second outlet 3 and all or part of the second fluid communication channel 31. The inlet 1 of the distributor 100 may form a part of the first body 7 (FIGS. 1, 2a, 2b), the second body 8 or the central body 6 (FIG. 2c). In the latter case, the fluid inlet 1 and the parts of the first and second fluid communication channels contained in the central body 6 are of course isolated from the region of the central body 6 housing the actuator 4 and the electrical connector 5. At least one seal 9 is used to ensure a seal around the junction with a fluid communication channel (for example, the second channel 31, as illustrated in FIG. 1) between the first body 7 and the second body 8.

Preferably, the three bodies are formed by molding a plastic material, chosen, for example, from polyamides (PA66, PA12, etc.), polyoxymethylene (POM), polyesters (polybutylene terephthalate (PBT), etc.), etc.

The inlet 1 and the two outlets 2, 3 of the distributor 100 each have a central axis.

According to a first embodiment, the central axes of the two outlets 2, 3 are disposed in the same plane (x,y) and the central axis of the inlet 1 is disposed in a different parallel plane, as illustrated in FIG. 2a. The electrical connector 5 may be disposed in the same plane (x,y) as the central axes of the outlets 2, 3, or in a different parallel or orthogonal plane.

According to another embodiment of the distributor 100, the central axes of the inlet 1 and of the two outlets 2, 3 are disposed in the same plane (x,y), as illustrated in FIGS. 1, 2b, 2c. The electrical connector 5 may be disposed in the same plane (x,y) as the central axes of the inlets 1 and the outlets 2, 3 (FIG. 2c), or in a different plane, for example, an orthogonal plane (x,z) (FIG. 2b).

According to yet another embodiment of the distributor 100, the first body 7 and the second body 8 are identical (FIG. 2c). Advantageously, in this embodiment, the central body 6 includes the inlet 1 of the distributor and part of the first 21 and second 31 fluid communication channels.

In one or the other of the embodiments described above, the inlet 1 and the two outlets 2, 3 of the distributor 100 advantageously each have a male or female fluid quick-connect end piece so as to facilitate their connection to a fluid distribution system.

The choice of one or the other of the embodiments for the distributors 100 that will be incorporated in the fluid distribution system depends on the space available for each distributor and/or the orientations and arrangements of the fluid conduits or electrical wires to be connected to the distributor to form the distribution system.

The present disclosure also relates to a fluid distribution system 200, particularly suitable for a vehicle.

Figure 3A:
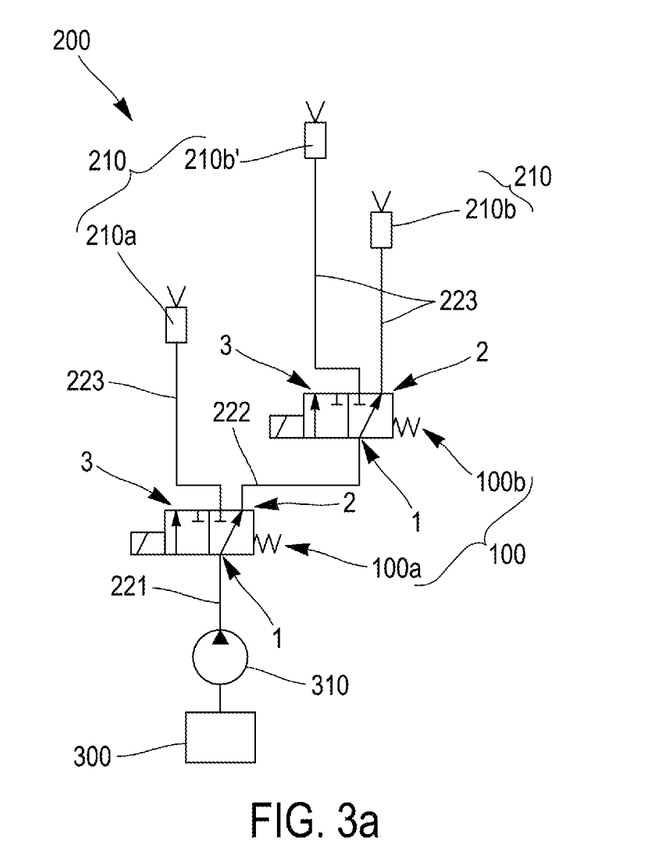
FIGS. 3a and 3b are two schematic illustrations of fluid distribution systems, according to the present disclosure, including a plurality of fluid distributors.
Figure 3B:
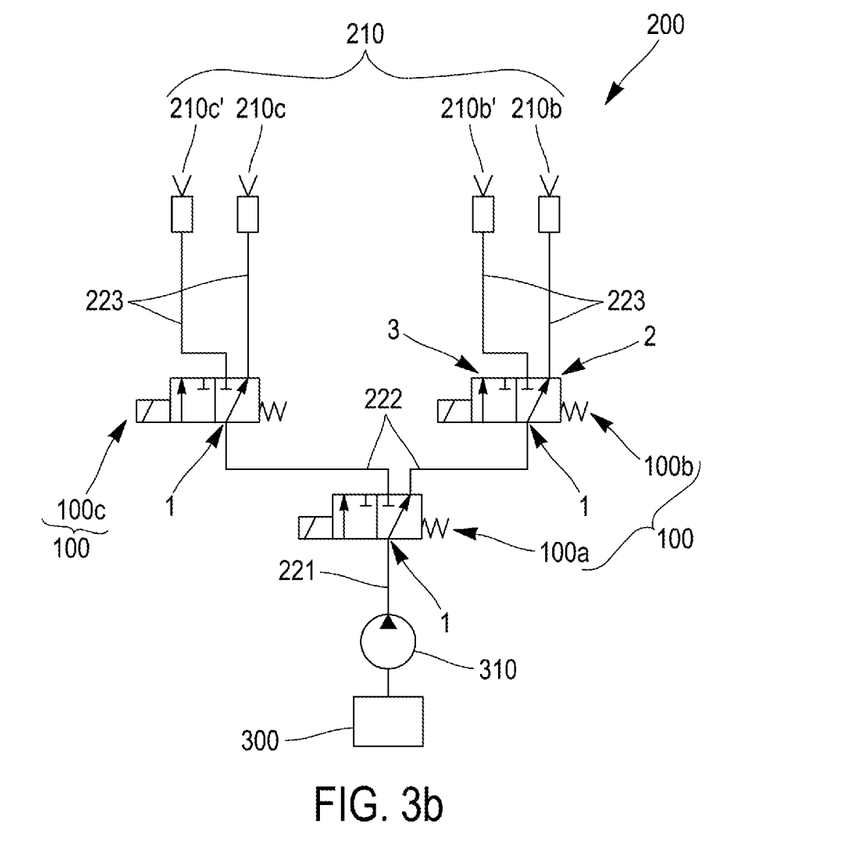

The distribution system 200 comprises a plurality n of independent fluid ejection devices 210 (FIGS. 3a, 3b). "Fluid ejection device" means any type of device through which the fluid can exit. The independent nature of each device 210 corresponds to the fact that the ejection of fluid through this device 210 can be controlled independently of the others. As mentioned in the introduction, each of these devices 210 is aimed, for example, at cleaning the outer surface of a sensor, the measurements from which are used to assist in driving the vehicle.

The ejection devices 210 could, for example, be jet nozzles, telescopic nozzles or oscillating nozzles. It should be noted that each ejection device will advantageously be provided with a valve, for example, formed of a silicone membrane, capable of deforming to allow pressurized fluid to pass and retracting to close the device when the fluid is not pressurized.

The distribution system 200 also comprises a plurality n−1 of fluid distributors 100 in accordance with the preceding description. Each distributor 100 is configured to establish a fluid connection either between the inlet 1 and the first outlet 2, or between the inlet 1 and the second outlet 3, in its initial state or its switched state, respectively.

Lastly, the distribution system 200 comprises means for conducting fluid to connect a fluid reservoir 300 to the n ejection devices, via the n−1 fluid distributors 100.

The distribution system 200 according to the present disclosure implements n−1 distributors 100 for n independent ejection devices 210. The distributors 100 are not necessarily attached to the nozzles of independent fluid ejection devices 210, which makes it possible to limit the size of the ejection devices 210.

According to an advantageous embodiment, illustrated in FIGS. 3a and 3b, the means for supplying the fluid comprise:
 a main fluid supply conduit 221 for connecting the inlet 1 of a first distributor 100a to a pump 310 connected to a fluid reservoir 300;
 a plurality of fluid outlet conduits 223 for connecting each ejection device 210 to an outlet 2, 3 of a distributor 100;
 at least one intermediate conduit 222 for connecting at least one outlet 2, 3 of a distributor 100a and the inlet 1 of a subsequent distributor 100b, 100c.

The main supply conduit 221, the plurality of outlet conduits 223 and the at least one intermediate conduit 222 form a fluid distribution line.

The main supply conduit 221 and the at least one intermediate conduit 222 advantageously form the "skeleton" of the distribution line, for example, extending around the periphery of the vehicle so as to conduct the fluid to each of the required fluid ejection points. The outlet conduits 223 form the branches supplying each independent fluid ejection device 210. The distribution system 200 according to the present disclosure thus makes it possible to reduce the length of the distribution line.

Figure 4:
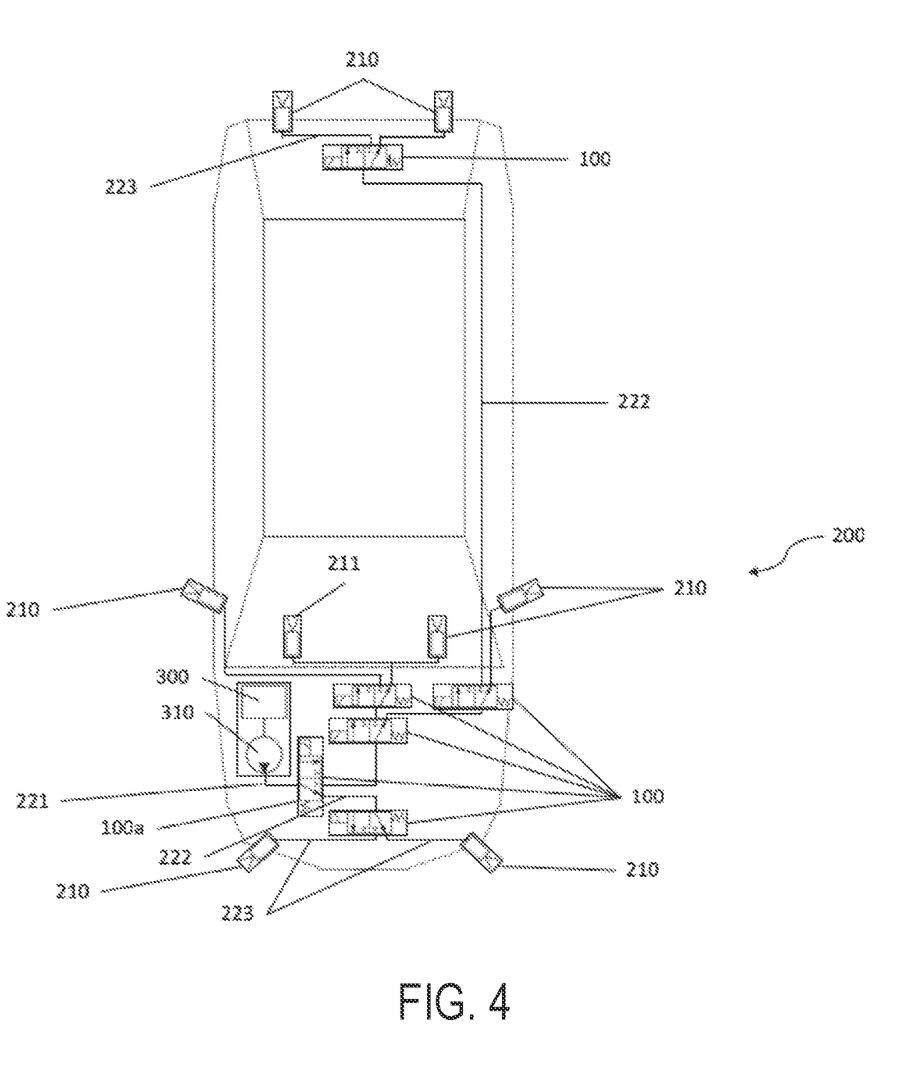
FIG. 4 is a schematic illustration of a fluid distribution system in a vehicle, according to the present disclosure.

In the example illustrated in FIG. 4, the distribution system 200 comprises six distributors 100, seven independent ejection devices 210 and a dependent ejection device 211; the fluid ejection through the dependent ejection device 211 will be simultaneous with the ejection of one of the independent devices 210, the two devices 210, 211 being connected to the same outlet 2 of a distributor 100.

Lastly, the present disclosure relates to a method for ejecting a fluid through an ejection device 210, using the fluid distribution system 200 described above.

When it is necessary to eject fluid, for example, through a device 210c' illustrated in FIG. 3b, the ejection method comprises a first step of activating the actuator 4 of the first distributor 100a and the actuator 4 of a second adjacent distributor 100c to set the distributors 100a, 100c to their switched state. In its switched state, the first distributor 100a will establish a fluid connection between its inlet 1 and its second outlet 3; and in its switched state, the adjacent distributor 100c will establish a fluid connection between its inlet 1 and its second outlet 3. Thus, the distribution system 200 is in a configuration enabling fluid communication between the main fluid supply conduit 221 and the ejection device 210c'.

The ejection method according to the present disclosure then comprises a second step of actuating the pump 310 to pressurize the fluid in the distribution line 221, 222, 223 and eject it through the device 210c'. As stated previously, the fluid pressure is greater than a predetermined pressure.

Lastly, the ejection method comprises a third step of deactivating the actuator 4, during the ejection of the fluid through the device 210c'. As stated previously, it is not necessary to keep the actuator 4 active because from the moment the fluid pressure is greater than the predetermined pressure, the distributor 100 is configured to remain in the switched state.

To stop the ejection of fluid through the device 210c' and return the distributors 100a and 100c to their initial state, the ejection method further comprises a fourth step of stopping the pump 310 so that the pressure of the fluid in the distribution line 221, 222, 223 is lower than the predetermined pressure. The distributors 100a, 100c then return to their initial state.

This same method may then be implemented to eject the fluid through another device 210c, 210b', 210b among the plurality n of ejection devices 210.

The actuators 4 of the plurality n−1 of distributors 100 and the pump may be controlled by the on-board computer.

The distributor 100, the fluid distribution system 200 and the ejection method according to the present disclosure may advantageously be used in a vehicle for distributing and supplying devices for ejecting cleaning fluid, for example.

They may also be used for the distribution of other types of fluids, for example, air, gasoline or oil, in other systems, for example, in the automotive field.

It goes without saying that, the present disclosure is not limited to the above-described embodiments and examples, and it is possible to achieve alternative embodiments without departing from the scope of the invention as defined by the claims.

What is claimed is:

1. A fluid distributor, comprising:
a fluid inlet;
a first outlet and a first fluid communication channel between the fluid inlet and the first outlet;
a second outlet and a second fluid communication channel between the fluid inlet and the second outlet;
an actuator comprising a movable piston able to move between an initial position and a switched position, the piston being disposed between a first deformable diaphragm and a second deformable diaphragm;
wherein the first deformable diaphragm has a first face in contact with a first end of the piston and a second face, opposite to the first face, intended to be in contact with fluid, the first diaphragm configured to close off the first channel when the piston is in the switched position, the first channel being open when the piston is in the initial position;
wherein the second deformable diaphragm has a first face in contact with a second end of the piston and a second face, opposite to the first face, intended to be in contact with the fluid, the second diaphragm configured to close off the second channel when the piston is in the initial position, the second channel being open when the piston is in the switched position; and
wherein the actuator is an electromagnetic actuator connected to an electrical connector of the fluid distributor and configured to control movement of the piston into the switched position.

2. The fluid distributor according to claim 1, further comprising a return element for returning the piston to the initial position when the actuator is inactive and when pressure of the fluid at the fluid inlet of the fluid distributor is lower than a predetermined pressure.

3. The fluid distributor according to claim 2, wherein the predetermined pressure is between $1 \times 10^5$ Pa and $1.5 \times 10^6$ Pa.

4. The fluid distributor according to claim 1, wherein a fluid-contact surface area of the first diaphragm is smaller than a fluid-contact surface area of the second diaphragm when the piston is in the switched position, and the fluid-contact surface area of the second diaphragm is smaller than the fluid-contact surface area of the first diaphragm when the piston is in the initial position.

5. The fluid distributor according to claim 1, wherein the first diaphragm forms a seal between a central body of the fluid distributor and the first fluid communication channel, and the second diaphragm forms a seal between the central body and the second fluid communication channel, guaranteeing that fluid does not reach an inside of the central body.

6. The fluid distributor according to claim 5, further comprising:
the electrical connector disposed in the central body;
a first body comprising the first outlet and at least a portion of the first fluid communication channel; and
a second body comprising the second outlet and at least a portion of the second fluid communication channel; and
wherein the fluid inlet of the fluid distributor forms a part of the first body, the second body or the central body, and wherein the actuator is disposed in the central body.

7. The fluid distributor according to claim 6, wherein the fluid inlet and the first and second outlets each have a central axis, the central axes of the fluid inlet and the first and second outlets disposed in the same plane.

8. The fluid distributor according to claim 7, wherein the electrical connector and central axes of the fluid inlet and two outlets are disposed in a common plane.

9. The fluid distributor according to claim 6, wherein the first body and the second body are identical.

10. The fluid distributor according to claim 6, wherein the central body, the first body and the second body comprise molded plastic.

11. The fluid distributor according to claim 1, wherein the fluid inlet and the first and second outlets each have a male or female fluid quick-connect tip.

12. A system for distributing a fluid in a vehicle, comprising:
- a plurality n of independent fluid ejection devices;
- a plurality n−1 of fluid distributors according to claim 1, each of the plurality n−1 of fluid distributors configured to establish a fluid connection either between the fluid inlet and the first outlet, or between the fluid inlet and the second outlet or another outlet, in an initial state or in a switched state, respectively; and
- means for conducting fluid to connect a fluid reservoir to the plurality n of independent fluid ejection devices, via the plurality n−1 of fluid distributors.

13. The system according to claim 12, wherein the means for conducting fluid comprise:
- a main fluid supply conduit for connecting the fluid inlet of a first fluid distributor to a pump connected to a fluid reservoir;
- a plurality of fluid outlet conduits for connecting each ejection device to an outlet of a fluid distributor among the plurality n−1 of fluid distributors; and
- at least one intermediate conduit for connecting at least one outlet of a fluid distributor among the plurality n−1 of fluid distributors and the fluid inlet of a subsequent fluid distributor.

14. A method for ejecting a fluid through an ejection device, using the fluid distribution system according to claim 13, comprising:
- activating the actuator of at least one fluid distributor to set the at least one fluid distributor to its switched state, so as to put the main fluid supply conduit and the ejection device in fluid communication;
- actuating the pump to pressurize the fluid in the fluid distribution system and to eject it through the ejection device; and
- deactivating the actuator during the ejection of the fluid.

15. The method according to claim 14, further comprising:
- stopping the pump so that pressure of the fluid in the fluid distribution system is lower than a predetermined pressure so as to stop ejection of fluid through the ejection device and return each fluid distributor of the plurality n−1 of fluid distributors to the initial state of the respective fluid distributor of the plurality n−1 of fluid distributors.

16. The system according to claim 12, wherein the ejection devices are jet nozzles, telescopic nozzles or oscillating nozzles.

* * * * *